United States Patent
Eckberg et al.

(10) Patent No.: US 12,460,080 B2
(45) Date of Patent: Nov. 4, 2025

(54) PHOTOCURABLE SILICONE COMPOSITIONS AND PROCESS FOR MANUFACTURE OF RELEASE LINERS

(71) Applicant: Momentive Performance Materials Inc., Waterford, NY (US)

(72) Inventors: Richard Paul Eckberg, Hillsborough, NC (US); Verena Cramer, Bergisch Gladbach (DE); John A. Cummings, Gansevoort, NY (US); Thorsten Felder, Dusseldorf (DE); Robert Lawrence Frye, Painesville, OH (US); Johannes Hepperle, Langenfeld (DE); Anita Witossek, Langenfeld (DE)

(73) Assignee: Momentive Performance Materials Inc., Waterford, NY (US)

( * ) Notice: Subject to any disclaimer, the term of this patent is extended or adjusted under 35 U.S.C. 154(b) by 494 days.

(21) Appl. No.: 17/178,672

(22) Filed: Feb. 18, 2021

(65) Prior Publication Data
US 2021/0277243 A1    Sep. 9, 2021

Related U.S. Application Data

(60) Provisional application No. 62/978,488, filed on Feb. 19, 2020.

(51) Int. Cl.
| | | |
|---|---|---|
| C08L 83/06 | (2006.01) | |
| B05D 3/02 | (2006.01) | |
| B05D 3/06 | (2006.01) | |
| C09D 183/06 | (2006.01) | |
| C09J 7/40 | (2018.01) | |

(52) U.S. Cl.
CPC ............ C08L 83/06 (2013.01); B05D 3/0263 (2013.01); B05D 3/0272 (2013.01); B05D 3/067 (2013.01); C09D 183/06 (2013.01); C09J 7/401 (2018.01); C09J 7/403 (2018.01); *C08L 2205/025* (2013.01); *C08L 2205/035* (2013.01); *C09J 2483/005* (2013.01)

(58) Field of Classification Search
CPC ........... C08L 83/06; C08L 83/08; C08L 83/04
USPC ...................................... 528/5, 15
See application file for complete search history.

(56) References Cited

U.S. PATENT DOCUMENTS

| | | |
|---|---|---|
| 3,715,334 A | 2/1973 | Karstedt |
| 4,256,870 A | 3/1981 | Eckberg |
| 4,279,717 A | 7/1981 | Eckberg et al. |
| 4,510,094 A | 4/1985 | Drahnak |
| 4,600,484 A | 7/1986 | Drahnak |
| 4,916,169 A | 4/1990 | Boardman et al. |
| 6,150,546 A | 11/2000 | Butts |
| 6,451,869 B1 | 9/2002 | Butts |
| 6,548,568 B1 | 4/2003 | Pinto et al. |
| 7,090,923 B2* | 8/2006 | Griswold ............... C08J 3/03 |
| | | 428/447 |
| 8,088,878 B2 | 1/2012 | Koellnberger |
| 2004/0161618 A1 | 8/2004 | Griswold et al. |
| 2011/0003906 A1 | 1/2011 | Angermaier et al. |
| 2012/0309921 A1* | 12/2012 | Taniguchi ............. C08L 83/04 |
| | | 528/15 |
| 2015/0124338 A1 | 5/2015 | Mayumi et al. |
| 2021/0317335 A1* | 10/2021 | Felder ..................... C08L 83/06 |

FOREIGN PATENT DOCUMENTS

| | | |
|---|---|---|
| EP | 0146307 | 6/1985 |
| JP | 1994157551 | 1/1996 |
| JP | 2007302775 | 11/2007 |
| JP | 2011012264 | 1/2011 |
| JP | 2013129691 | 7/2013 |
| JP | 2013129809 | 7/2013 |
| JP | 2015110752 | 6/2015 |
| JP | 2018003194 | 1/2018 |

OTHER PUBLICATIONS

Patent Cooperation Treaty (PCT), International Search Report and Written Opinion for Application PCT/US2021/018485 filed Feb. 18, 2021, mailed Jun. 9, 2021, International Searching Authority, EP.
Fritz et al., "Spektroskopische Untersuchungen an Organometallischen Verbindugen" Journal of Organometallic Chemistry. vol. 5, 1966. pp. 181-184.

* cited by examiner

*Primary Examiner* — Margaret G Moore
(74) *Attorney, Agent, or Firm* — James Abruzzo; McDonald Hopkins LLC

(57) ABSTRACT

A photocurable silicone composition, a method of forming a coating from such compositions, and an article comprising a coating formed from such compositions and/or methods are shown and described herein. The photocurable silicone composition comprises (i) a vinyl functional polysiloxane; (ii) a hydride functional polysiloxane; (iii) a photoactive catalyst; and (iv) an acid-anhydride functional polysiloxane. The composition and method can be employed to process thin coatings onto paper and film substrates followed by exposure to actinic radiation at ambient conditions of temperature and atmosphere for manufacture of release liners.

19 Claims, No Drawings

PHOTOCURABLE SILICONE COMPOSITIONS AND PROCESS FOR MANUFACTURE OF RELEASE LINERS

CROSS-REFERENCE TO RELATED APPLICATIONS

This application claims priority to and the benefit of U.S. Parovisional Application 62/978,488, filed on Feb. 19, 2020, entitled "PHOTOCURABLE SILICONE COMPOSITIONS AND PROCESS FOR MANUFACTURE OF RELEASE LINERS," the disclosure of which is incorporated by reference herein in its entirety.

FIELD OF INVENTION

The present invention relates to curable silicone compositions, articles comprising cured coatings formed from the compositions, and processes for making such coatings and articles. In particular, the present invention relates to silicone compositions that are photocurable, processes for forming a coating from such compositions, and articles comprising such coatings. The compositions and processes are particularly useful for forming release liners comprising the silicone coatings.

BACKGROUND

Silicone release coatings made up of vinyl-silicone and hydride-silicone polymers plus low levels of silicone-compatible platinum (II) complexes such as the Karstedt's hydrosilylation catalyst disclosed in U.S. Pat. No. 3,715,334 and platinum inhibitors such as maleate esters disclosed by Eckberg in U.S. Pat. No. 4,256,870 are known and have been utilized for some time. Such coatings can be applied to paper or film substrates without use of solvent and cured by application of heat that evaporates the inhibitor. To cure at a high rate of speed typically requires exposure to temperatures of greater than 150° C. for a period of several seconds, which can demoisturize paper and degrade thermally sensitive films such as polyethylene or polyester. A great deal of energy is expended to heat curing ovens, which are very large in order to permit rapid processing of release liners.

Silicone polymers bearing reactive functional groups including cycloaliphatic epoxy and acrylate groups are commercially available materials that crosslink when exposed to focused UV light in the presence of iodonium and free radical photocatalysts. Such products are used for manufacture of release liners. (See, e.g., U.S. Pat. Nos. 4,279,717, and 6,548,568, respectively.) Such polymers, however, require multiple processing steps employing various organic molecule inputs and are much more expensive than the vinyl- and hydride-functional silicone polymers curable by platinum catalyzed hydrosilylation. In addition, useful cure speed of acrylate-functional silicone coatings requires an inert atmosphere with less than 50 ppm oxygen present in the UV cure chamber. The reactive polar functionality necessary to render such silicones capable of rapid photo-crosslinking interferes with release of aggressive adhesives such as common emulsion acrylic types.

Photo-active platinum (IV) trialkyl cyclopentadiene compounds been described by Robinson and Shaw, *J. Chem Soc* 1965, 1529, and by Fritz and Shwarzhaus, *J. Organometallic Chem* 5, 181 (1966), among others. U.S. Pat. No. 4,600,484 describes the use of various Cyclopentadienyl (Cp) trialkyl Pt (IV) [abbreviated CpPtR3] compounds for photo-activated hydrosilylation reactions including addition of olefins to SiH-functional silane and siloxane monomers, as well as crosslinking reactions between vinyl-functional polydimethyl siloxane and SiH-functional polysiloxanes to convert liquid mixtures thereof into solid abhesive coatings useful for release of pressure sensitive adhesives. These compositions, however, require relatively high concentrations of the photo-active platinum catalyst (200 ppm Pt or higher) to achieve rapid cure of >2 micron thick silicone coatings when applied to a polyethylene-coated kraft paper sheet then exposed to a UV emission from a 200 watt/in mercury vapor UV lamp.

U.S. Pat. No. 4,916,169 describes the addition of various visible light absorbing polycyclic aromatic hydrocarbon sensitizers such as anthracenes, thioxanthones, and anthraquinones to allow for visible light cure of $CpPtR_3$—photocatalyzed silicone coatings and thick section silicone elastomeric compositions such as dental molds. Boardman describes lengthy light absorption (several minutes' irradiation) of viscous vinyl and SiH functional polydimethylsiloxane compositions including high catalyst concentrations (>300 ppm Pt) to produce thick rubbery products. It should be noted that some of the polycyclic sensitizers described in the '169 patent are poorly soluble in dimethyl silicone matrices.

U.S. Pat. No. 6,451,869 relates to the use of self-sensitized dicyclopentadienyl trimethyl Pt(IV) photo-activated hydrosilylation catalysts for fast crosslinking of vinylsilicone and hydride-silicone blends upon exposure to UV light. These catalysts employ substitution of aromatic UV absorbing groups such as naphthyl and phenanthryl onto the Cp ring prior to syntheses of $[Ar-Cp]PtMe_3$ catalysts. However, Butts reports less than 50% yields of the final self-sensitized photocatalysts, making such compounds expensive and difficult to produce for commercial purposes.

U.S. Pat. No. 8,088,878 describes modification of $CpPtR_3$ photo-activated hydrosilylation catalysts by substitution of hydrolysable siloxy substituents such as $—Si(OMe)_3$ onto the cyclopentadiene ring in order to render the catalyst non-volatile and to enable it to cure into a silicone elastomeric article produced by UV light irradiation of viscous blends of silanol-stopped polydimethylsiloxane, vinylsilicone polymers and SiH functional siloxanes with a condensation co-catalyst such as $zinc(acac)_2$. Irradiation times of 10 seconds followed by long post-cure of up to 2 hours to complete crosslinking and subsequent condensation of the platinum catalyst compound are reported. Such processing is not suitable for commercial production of silicone release liners.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

The present invention is generally directed to novel addition-curable silicone formulations that can be processed by application of thin coatings of these formulations onto paper and film substrates followed by exposure to actinic radiation at ambient conditions of atmosphere and ambient or slightly elevated temperature for manufacture of release liners. The formulations comprise vinyl- and hydride-functional polysiloxane polymers (e.g., vinyl and hydride functional polydimethylsiloxane polymers), acid-anhydride functional polysiloxane additives, and photo-active platinum (IV) cyclopentadienyl catalysts capable of initiating crosslinking hydrosilylation reactions upon absorption of ultraviolet light. Selection of certain UV lamps and combinations of reflectors and filters has been found to significantly improve photocure performance of these systems. Additionally, exposing the curable compositions to low levels of heat prior to exposure to UV light can provide improved curing of the composition.

It is therefore an object of the present invention to provide a commercially viable means of processing addition cure silicone release coatings by ultraviolet light irradiation of an addition-curable silicone formulation. The present composition, methods and processes provide photo-curable silicone release coatings that do not suffer the disadvantages of prior methods and systems including those described above. These and other objectives are achieved by formulating silicone coating compositions comprising a vinyl-functional polysiloxane, a hydride-functional polysiloxane crosslinking polymer, a catalytic quantity of a cyclopentadienyl trialkyl platinum (IV) photo-hydrosilylation catalyst, and a low level of acid anhydride functional polydimethyl-methylhydride siloxane anchorage and cure additive.

In one aspect, a cyclopentadienyl trialkyl platinum (IV) catalyst can be used in combination with vinyl-functional and hydride-functional polysiloxanes (e.g., polydimethylsiloxanes) plus certain other polysiloxanes bearing alkyl-acid anhydride functionality to provide a release coating composition capable of high speed cure on common supercalendared kraft papers and poly-coated kraft papers when applied as 1-2 micron coatings and processed with focused iron-doped mercury vapor ultraviolet curing lamps or (preferred) combinations of mild pre-heating followed by UV exposure.

In one aspect, provided is a photocurable silicone composition comprising:
(i) a vinyl functional polysiloxane;
(ii) a hydride functional siloxane;
(iii) a photoactive catalyst; and
(iv) an acid-anhydride functional polysiloxane.

In one embodiment, the vinyl functional polysiloxane is of the formula (I):

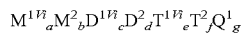

where $M^{1Vi}=(R^1)(R^2)(CH_2=CH)SiO_{1/2}$
$M^2=(R^3)(R^4)(R^5)SiO_{1/2}$
$D^{1Vi}=(R^6)(CH_2=CH)SiO_{2/2}$
$D^2=(R^7)(R^8)SiO_{2/2}$
$T^{1Vi}=(CH_2=CH)SiO_{3/2}$
$T^2=(R^9)SiO_{3/2}$
$Q^1=SiO_{4/2}$ wherein $R^1$, $R^2$, $R^3$, $R^4$, $R^5$, $R^6$, $R^7$, $R^8$, and $R^9$ are each independently a C1-C10 saturated hydrocarbon radical; $50<a+b+c+d+e+f+g<10,000$, and $a+c+e$ is greater than 0.

In one embodiment, the vinyl functional polysiloxane is of the formula (Ia):

$$M^{1Vi}D^{1Vi}{}_cD^2{}_dM^{1Vi} \quad (Ia)$$

where $M^{1Vi}$ is $(R^1)(R^2)(CH_2=CH)SiO_{1/2}$; $D^{1Vi}$ is $(R^6)(CH_2=CH))SiO_{2/2}$; D2 is $(R^7)(R^8)SiO_{2/2}$; $R^1$, $R^2$, $R^3$, $R^5$, $R^6$, $R^7$, and $R^8$ are each independently a C1-C10 saturated hydrocarbon radical; c is 0-10; and d is 50-250.

In one embodiment of the composition of any previous embodiment, the hydride functional siloxane is of the formula (II):

$$M^{3H}{}_hM^4{}_iD^{3H}{}_jD^4{}_kT^{3H}{}_lT^4{}_mQ^2{}_n \quad (II)$$

where $M^{3H}=(R^{10})(R^{11})(H)SiO_{1/2}$
$M^4=(R^{12})(R^{13})(R^{14})SiO_{1/2}$
$D^{3H}=(R^{15})(H)SiO_{2/2}$
$D^4=(R^{16})(R^{17})SiO_{2/2}$
$T^{3H}=(H)SiO_{3/2}$
$T^2=(R^{18})SiO_{3/2}$
$Q^2=SiO_{4/2}$ wherein $R^{10}$, $R^{11}$, $R^{12}$, $R^{13}$, $R^{14}$, $R^{15}$, $R^{16}$, $R^{17}$, and $R^{18}$ are each independently a C1-C10 saturated hydrocarbon radical; the subscripts h, i, j, k, 1, m, and n are zero or positive subject to the following limitations: $2<h+i+j+k+l+m+n<1,000$, and $h+j+l$ is greater than 0.

In one embodiment, the hydride functional siloxane is of the formula (IIb):

$$M^4D^{3H}{}_jM^4 \quad (IIb)$$

where $M^4D^{3H}$, and $M^4$ are as defined above, and j is 10-40.

In one embodiment, the hydride function siloxane is a copolymer of the formula (IIa):

$$M^4D^{3H}{}_jD^4{}_kM^4Q^2 \quad (IIa)$$

where $M^4D^{3H}$, $D^4$, $M^4$, and $Q^2$ are as defined above, and j+k is 10-40.

In one embodiment of the photocurable composition of any of the previous embodiments, the photoactive catalyst is selected from one or more of a platinum-cyclopentadiene complex of the formula (i) $R^{19}CpPtR^{20}{}_3$, where $R^{19}$ and $R^{20}$ are each independently selected from an C1-C10 alkyl group, and Cp is a cyclopentadiene group, wherein the bond between Cp and Pt is an eta bond; (ii) $[(R^{29})_a(R^{30})_bCp]Pt(R^{31})_3$ where $R^{29}$ is a C 7-20 aromatic organic radical, $R^{30}$ and $R^{31}$ are each independently a C 1-22 aliphatic organic radical, Cp is a cyclopentadienyl radical, "a" is an integer equal to 1 to 3 inclusive, "b" is an integer equal to 0 to 3 inclusive, and the sum of a+b is equal to 1 to 4 inclusive; and/or (iii) $[(R^{32})_c(R^{33})_dCp]PtR^{34}R^{35}Q$, where $R^{32}$ is a C6-20 aromatic radical, $R^{33}$, $R^{34}$, and $R^{35}$ are each independently a C1-22 aliphatic organic radical, Cp is a cyclopentadienyl radical, Q is a silicon-containing organic sensitizing group, "c" and "d" are whole numbers independently equal to 0 to 5 inclusive, and the sum of "c+d" is equal to 0 to 5 inclusive.

In one embodiment, the photoactive catalyst is a Pt(IV) compound methylcyclopentadienyltrimethylplatinum.

In one embodiment of the photocurable composition of any of the previous embodiments, the acid anhydride functional silicone is a compound of the formula $$M^{5A}D^5{}_oD^{6A}{}_pD^{7H}{}_qM^{5A}$$

where $M^{5A}$ is $(R^{21})(R^{22})(R^{23})SiO_{1/2}$
$D^5$ is $(R^{24})(R^{25})SiO_{2/2}$,
$D^{6A}$ is $(R^{26})(R^{27})SiO_{2/2}$
$D^{7H}=(R^{28})(H)SiO_{2/2}$ where $R^{21}$, $R^{22}$, $R^{24}$, $R^{25}$, $R^{26}$, and $R^{28}$ are each independently a C1-C10 saturated hydrocarbon radical; $R^{23}$ and $R^{27}$ each independently represents an acid-anhydride functional group that may be derived from the reaction of allyl succinic anhydride with Si(H) functionality; o+q is 10-40, and p is 1-20

In one embodiment of the photocurable composition of any of the previous embodiments, the composition further comprises a siloxanol resin.

In one embodiment of the photocurable composition of any of the previous embodiments, wherein the ratio of hydride groups to vinyl groups is from about 0.5:1 to about 10:1.

In one embodiment of the photocurable composition of any of the previous embodiments, the ratio of hydride groups to vinyl groups is from about 1.5:1 to about 3:1.

In one embodiment of the photocurable composition of any of the previous embodiments, the ratio of hydride groups to vinyl groups is from about 2:1 to about 2.5:1.

In one embodiment of the photocurable composition of any of the previous embodiments, the vinyl functional polysiloxane (i) is present in an amount of from about 80 to about 99 parts by weight; the hydride functional polysiloxane (ii) is present in an amount of from about 1 to about 20 parts by weight; the acid-anhydride functional polysiloxane (iv) is present in an amount of from about 01 to 10 parts by weight, and the photoactive catalyst (iii) is present in an amount sufficient to provide platinum in an amount of about 50 to about 150 ppm; and each of the parts by weight is based on the total weight of the composition.

In another aspect, provided is a method of forming a silicone film on a substrate comprising: (a) applying the photocurable silicone composition of any of the previous embodiments onto the surface of the substrate; and (b) exposing the photocurable silicone composition to a UV light source having a wavelength of from about 25-nm to about 500 nm.

In one embodiment, the UV light source is an H+ mercury vapor type UV lamp.

In one embodiment, the UV light source is a D type iron doped mercury vapor UV lamp.

In one embodiment of the method of any of the previous embodiments, the substrate carrying the silicone composition is conveyed at a speed of from about 20 feet per minute to about 1,000 feet per minute.

In one embodiment of the method of any of the previous embodiments, the method further comprises focusing the light from the UV light source onto the composition using one or more reflectors.

In one embodiment of the method of any of the previous embodiments, the method further comprises exposing the silicone composition and substrate to which it is applied to a heat source prior to exposing the composition to the UV light source.

In one embodiment, the heat source is chosen from an oven, an infrared lamp, an LED light source, or a combination thereof.

In one embodiment, the composition and substrate to which it is applied are heated to a temperature of from about 25° C. to about 120° C.

In one embodiment of the method of any of the previous embodiments, the substrate is selected from one or more of glassine, super-calendared Kraft (SCK) paper, clay-coated kraft (CCK) paper, polyethylene, polypropylene, polyester, a polyethylene-Kraft paper (PK), or a polypropylene-Kraft paper (PPK).

In still another aspect, provided is an article comprising a coating formed from the photocurable composition of any of any of the previous embodiments disposed on a surface of a substrate.

In one embodiment, the article is a release liner, and the substrate is selected from one or more of glassine, super-calendared Kraft (SCK) paper, clay-coated kraft (CCK) paper, polyethylene, polypropylene, polyester, a polyethylene-Kraft paper (PK), or a polypropylene-Kraft paper (PPK).

In still yet another aspect, provided is an adhesive article comprising an adhesive backed substrate in releasable contact with a release layer, the release layer comprising a coating formed from the phototcurable composition of any of the previous embodiments.

In still another aspect, provided is an article formed from the method of any of the previous embodiments.

The following description discloses various illustrative aspects. Some improvements and novel aspects may be expressly identified, while others may be apparent from the description.

DETAILED DESCRIPTION

Reference will now be made to exemplary embodiments, examples of which are described herein. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

As used in the instant application, the term "alkyl" includes straight, branched, and cyclic alkyl groups. Specific and non-limiting examples of alkyls include, but are not limited to, methyl, ethyl, propyl, hexyl, octyl, and isobutyl. In embodiments, the alkyl group is chosen from a C1-C30 alkyl, a C1-C18 alkyl, a C2-C10 alkyl, even a C4-C6 alkyl. In embodiments, the alkyl is chosen from a C1-C6 alkyl.

As used herein, the term "aryl" refers to a non-limiting group of any aromatic hydrocarbon from which one hydrogen atom has been removed. An aryl may have one or more aromatic rings, which may be fused, or connected by single bonds or other groups. Specific and non-limiting examples of aryls include, but are not limited to, tolyl, xylyl, phenyl, and naphthalenyl. In embodiments, an aryl group may be chosen from a C6-C30 aryl, a C6-C20 aryl, even a C6-C10 aryl.

Viscosity may be measured in any suitable manner. In one embodiment, viscosity may be measured using an Ostwald viscometer. Ostwald viscosity is defined by the time required for a viscous fluid to drain through a specified distance of a calibrated tube at 25° C. multiplied by a constant for the tube determined on a liquid of known viscosity as selected by the user. In one embodiment, the reference liquid is deionized water. Alternatively, the constant for the instrument may be determined and provided by the instrument manufacturer.

Provided is a photocurable silicone composition, a method or process for treating such composition to form a cured coating, and articles comprising such coatings.

Photocurable Silicone Composition

The present photocurable silicone compositions comprise: (i) a vinyl functional polysiloxane; (ii) a hydride functional polysiloxane; (iii) a photoactive catalyst; and (iv) an acid-anhydride functional polysiloxane. The composition may optionally include other additives and materials including, but not limited to, (v) an additional cross-linker, and (vi) a silanol stopped fluid. The photocurable silicone composition may be cured by exposure to UV radiation to form a coating on a surface of a substrate.

The silicone composition is generally provided to have a flowable consistency such that it can be applied to a substrate as a coating, e.g., by roll-coating, spraying, and the like. For example, the silicone composition can be an uncured or partially cured liquid having a viscosity low enough so that it can be readily applied as a coating on a substrate.

The vinyl functional polysiloxane can be chosen as desired for a particular purpose or intended application to provide a composition suitable for forming a desired coating or film. The vinyl functional siloxane comprises vinyl radicals attached to silicon via carbon-silicon bonds. The vinyl radicals may be in the terminal position (i.e., vinyl chain-stopped), pendant to a silicon atom in the backbone of the siloxane polymer, or a combination thereof. Typically, the vinyl functional polysiloxane has a viscosity ranging from about 50 to about 100,000 centipoise (cPs) at 25° C., where 1 centipoise (cPs)=1 millipascal-second (mPa·s). In embodiments, the viscosity can range from about 100 to about 50,000 cPs at 25° C.; from about 500 to about 25,000 cPs at 25° C.; from about 1,000 to about 10,000 cPs at 25° C.; or from about 2,500 to about 5,000 cPs. at 25° C. In one embodiment, the vinyl functional polysiloxane has a viscosity of from about 200 to about 600 cPs at 25° C. Here as elsewhere in the specification and claims, numerical values may be combined to form new and non-specified ranges.

In one embodiment, the vinyl functional polysiloxane is of the formula (I):

$$M^{1Vi}{}_a M^2{}_b D^{1Vi}{}_c D^2{}_d T^{1Vi}{}_e T^2{}_f Q^1{}_g \quad (I)$$

where $M^{1Vi}=(R^1)(R^2)(CH_2=CH)SiO_{1/2}$
$M^2=(R^3)(R^4)(R^5)SiO_{1/2}$
$D^{1Vi}=(R^6)(CH_2=CH)SiO_{2/2}$
$D^2=(R^7)(R')SiO_{2/2}$
$T^{1Vi}=(CH_2=CH)SiO_{3/2}$
$T^2=(R^9)SiO_{3/2}$
$Q^1=SiO_{4/2}$
$R^1, R^2, R^3, R^4, R^5, R^6, R^7, R^8$, and $R^9$ are each independently a C1-C10 saturated hydrocarbon radical; $50<a+b+c+d+e+f+g<10,000$, and $a+c+e$ is greater than 1. In embodiments, $R^1, R^2, R^3, R^4, R^5, R^6, R^7, R^8$, and $R^9$ are a C1-C10 alkyl, a C2-C8 alkyl, or a C4-C6 alkyl. In one embodiment, $R^1, R^2, R^3, R^4, R^5, R^6, R^7, R^8$, and $R^9$ are each methyl. In one embodiment, $100<a+b+c+d+e+f+g<7,500$; $250<a+b+c+d+e+f+g<5,000$; or $500<a+b+c+d+e+f+g<2,500$.

In one embodiment, the vinyl functional polysiloxane is of the formula (Ia):

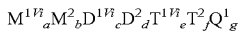

$$M^{1Vi}D^{1Vi}{}_c D^2{}_d M^{1Vi} \quad (Ia)$$

where $M^{1Vi}$ is $(R^1)(R^2)(CH_2=CH)SiO_{1/2}$; $D^{1Vi}$ is $(R^6)(CH_2=CH))SiO_{2/2}$; $D^2$ is $(R^7)(R^8)SiO_{2/2}$; $R^1, R^2, R^3, R^5, R^6, R^7$, and $R^8$ are each independently a C1-C10 saturated hydrocarbon radical; c is 0-10; and d is 50-250. In embodiments, $R^1, R^2, R^3, R^5, R^6, R^7$, and $R^8$ are a C1-C10 alkyl, a C2-C8 alkyl, or a C4-C6 alkyl. In one embodiment, $R^1, R^2, R^3, R^5, R^6, R^7$, and $R^8$ are each methyl. In one embodiment, c is 1-10, 2-8, or 4-6.

The vinyl functional siloxane is present in the composition in an amount of about 80 to about 99 parts by weight based on the total weight of the composition, from about 85 to about 95 parts, or from about 89 to about 92 parts.

The hydride functional polysiloxane is a siloxane polymer comprising Si—H groups in the terminal position, the polymer backbone, or a combination thereof. The hydride functional siloxane polymer can be a linear molecule or it may be branched. Typically, the hydride functional polysiloxane has a viscosity below about 1,500 centipoise (cPs) at 25° C., more typically in the range of from about 20 to about 1,000 cPs at 25° C., and even more typically in the range of from about 30 to about 500 cPs at 25° C. Here as elsewhere in the specification and claims, numerical values may be combined to form new and non-specified ranges.

In one embodiment, the hydride functional siloxane is of the formula (II):

$$M^{3H}{}_h M^4{}_i D^{3H}{}_j D^4{}_k T^{3H}{}_l T^4{}_m Q^2{}_n \quad (II)$$

where $M^{3H}=(R^{10})(R^{11})(H)SiO_{1/2}$
$M^4=(R^{12})(R^{13})(R^{14})SiO_{1/2}$
$D^{3H}=(R^{15})(H)SiO_{2/2}$
$D^4=(R^{16})(R^{17})SiO_{2/2}$
$T^{3H}=(H)SiO_{3/2}$
$T^2=(R^{18})SiO_{3/2}$
$Q^2=SiO_{4/2}$
$R^{10}, R^{11}, R^{12}, R^{13}, R^{14}, R^{15}, R^{16}, R^{17}$, and $R^{18}$ are each independently a C1-C10 saturated hydrocarbon radical; the subscripts h, i, j, k, 1, m, and n are zero or positive subject to the following limitations: $2 \le h+i+j+k+l+m+n<1,000$, and $h+j+l$ is greater than 0. In embodiments, $R^{10}, R^{11}, R^{12}, R^{13}, R^{14}, R^{15}, R^{16}, R^{17}$, and $R^{18}$ are a C1-C10 alkyl, a C2-C8 alkyl, or a C4-C6 alkyl. In one embodiment, $R^{10}, R^{11}, R^{12}, R^{13}, R^{14}, R^{15}, R^{16}, R^{17}$, and $R^{18}$ are each methyl.

In one embodiment, the hydride function polysiloxane is a copolymer of the formula (IIa):

$$M^4 D^{3H}{}_j D^4{}_k M^4 \quad (IIa)$$

where $j+k$ is 10-40.

In another embodiment, the hydride functional polysiloxane is a polymer of the formula (IIb):

$$M^4 D^{3H}{}_j M^4 \quad (IIb)$$

where j is 10-40.

In still another embodiment, the hydride functional polysiloxane is of the formula (IIc):

$$M^{3H}{}_h Q^2 \quad (IIc)$$

where h is 1-4.

The hydride functional polysiloxane is present in amount of from about 1 to about 20 parts, about 2 to about 15 parts, or about 5 to about 10 parts based on the total weight of composition.

It will be appreciated that the hydride functional polysiloxane can be provided as a mixture of hybrid functional silicones of different formulas. The different hydride functional polysiloxanes can be of similar structures but of different molecular weight (weight average molecular weight), or they can be of different structures. In one embodiment, the hydride functional polysiloxane is provided as a mixture of a hydride functional polysiloxane of the formula (IIa) and a hydride functional polysiloxane of the formula (IIb).

The ratio of hydride to vinyl groups can be selected as desired. In one embodiment, the ratio of hydride to vinyl groups is about 0.5:1 to about 10:1, about 1:1 to about 7.5:2, or about 2.5:1 to about 5:1. In embodiments, the ratio of hydride to vinyl groups is about 1.5:1 to about 3:1. In still another embodiment, the ratio of hydride groups to vinyl groups is about 2:1 to about 2.5:1. In one embodiment, the ratio of hydride to vinyl groups can be 1:1, 1.2:1, 1.5:1, 1.75:1, 2:1, 2.25:1, 2.5:1, or 3:1. Thus, the variables a, c, e, h, j, and l in Formulas (I) and (II) may be selected to provide the desired ratio of hydride to vinyl groups.

The composition includes a photo-active platinum catalyst suitable for catalyzing the reaction of the vinyl functional siloxane and the hydride functional siloxane upon exposure to a sufficient wavelength of light. Particularly suitable catalysts are UV-activable Pt catalysts which in the absence of light are inert and which, following irradiation with light having a wavelength of 250 to 500 nm, can be converted into Pt catalysts which are active at room temperature. Examples of suitable UV-activable Pt catalysts include but are not limited to (alkyl-cyclopentadienyl)trialiphatic Pt compounds or derivatives thereof as disclosed, for example, in EP 0146307, which is incorporated by reference herein in its entirety. Particularly suitable are cyclopentadienyltrimethylplatinum, methylcyclopentadienyltrimethylplatinum, and derivatives thereof comprising substituted cyclopentadienyl moieties, which may optionally be attached directly or via further, additional moieties to polymers. Other suitable photoactive hydrosilylation catalysts include, for example, bis(acetylacetonato)platinum compounds and also the corresponding derivatives thereof. Either an individual catalyst or a mixture of at least two catalysts may be used.

In one embodiment, the photoactive catalyst is a platinum-cyclopentadiene complex of the formula $R^{19}CpPtR^{20}_3$, where $R^{19}$ and $R^{20}$ are each independently selected from an C1-C10 alkyl group, and Cp is a cyclopentadiene group, where the bond between Cp and Pt is an eta bond. In one embodiment, $R^{19}$ and $R^{20}$ are each independently selected from a C1-C6 alkyl, or a C2-C4 alkyl. In one embodiment, $R^{19}$ and $R^{20}$ are each methyl.

Additional catalysts that are suitable for catalyzing the hydrosilylation reaction are those described in U.S. Pat. No. 6,127,446 and EP Patent 1050538, each of which is incorporated herein by reference. In one embodiment, the photoactive catalyst is a compound of the formula $[(R^{29})_a(R^{30})_bCp]Pt(R^{31})^3$ where $R^{29}$ is a C 7-20 aromatic organic radical, $R^{30}$ and $R^{31}$ are each independently a C 1-22 aliphatic organic radical, Cp is a cyclopentadienyl radical, "a" is an integer equal to 1 to 3 inclusive, "b" is an integer equal to 0 to 3 inclusive, and the sum of a+b is equal to 1 to 4 inclusive. In one embodiment, the photoactive catalyst is a compound of the formula $[(R^{32})_c(R^{33})_dCp]PtR^{34}R^{35}Q$, where $R^{32}$ is a C6-20 aromatic radical, $R^{33}$, $R^{34}$, and $R^{35}$ are each independently a C1-22 aliphatic organic radical, Cp is a cyclopentadienyl radical, Q is a silicon-containing organic sensitizing group, "c" and "d" are whole numbers independently equal to 0 to 5 inclusive, and the sum of "c+d" is equal to 0 to 5 inclusive.

Some examples of such catalysts include, but are not limited to, aryl(methylcyclopentadienyl)trimethyl platinum and aryl(methcyclopentadienyl)dimethyl(trimethylsilylmethyl)platinum, where the aryl functionality can be, for example, naphthy, phenanthryl, or the like. Some specific examples include, but are not limited to, [(1'-naphthyl)-cyclopentadeinyl]trimethyl platinum; [(2'-naphthyl)-cyclopentadienyl]trimethyl platinum; [1-methyl-3-(1'-naphthyl)-cyclopentadienyl]trimethyl platinum; [1-methyl-3-(2'-naphthyl)-cyclopentadienyl]trimethyl platinum; [(4'-biphenyl)-cyclopentadienyl]trimethyl platinum; [1-(4'-biphenyl)-3-methyl-cyclopentadienyl]trimethyl platinum; [(9'-phenanthryl)-cyclopentadienyl]-trimethyl platinum; [1-methyl-3-(9'-phenanthryl)-cyclopentadienyl]-trimethyl platinum; [1-(2'-anthracenyl)-3-methyl-cyclopentadienyl]-trimethyl platinum; [(2'-anthracenyl)-cyclopentadienyl] trimethyl platinum; [(1'-pyrenyl)-cyclopentadienyl]trimethyl platinum; [1-methyl-3-(1'-pyrenyl)-cyclopentadienyl] trimethyl platinum; (cyclopentadienyl)dimethyltrimethylsilylmethyl platinum; (cyclopentadienyl)diethyltrimethylsilylmethyl platinum; (cyclopentadienyl)dipropyltrimethylsilylmethyl platinum; (cyclopentadienyl)diisopropyltrimethylsilylmethyl platinum; (cyclopentadienyl)diallyltrimethylsilylmethyl platinum; (cyclopentadienyl)dibenzyltrimethylsilylmethyl platinum; (cyclopentadienyl)dimethyltriethylsilylmethyl platinum; (cyclopentadienyl)dimethyltripropylsilylmethyl platinum; (cyclopentadienyl)dimethyltriisopropylsilylmethyl platinum; (cyclopentadienyl)dimethyltriphenylsilylmethyl platinum; (cyclopentadienyl)dimethyldimethylphenylsilylmethyl platinum; (cyclopentadienyl)dimethylmethylphenylsilylmethyl platinum; (cyclopentadienyl)dimethyldimethyl(trimethylsiloxy)silylmethyl platinum; (cyclopentadienyl)dimethyldimethyl(dimethylvinylsiloxy)silylmethyl platinum; [(1'-naphthyl)cyclopentadienyl]trimethylsilylmethylplatinum; [(2'-naphthyl)cyclopentadienyl]trimethylsilylmethylplatinum; [1-methyl-3-(1'-naphthyl)cyclopentadienyl]trimethylsilylmethylplatinum; [1-methyl-3-(2'-naphthyl)cyclopentadienyl]trimethylsilylmethylplatinum; [(4'-biphenyl)cyclopentadienyl]trimethylsilylmethylplatinum; [1(4'-biphenyl)-3-methylcyclopentadienyl]trimethylsilylmethylplatinum; [(9'-phenanthryl)cyclopentadienyl]trimethylsilylmethylplatinum; [1-methyl-3-(9'-phenanthryl)cyclopentadienyl]trimethylsilylmethylplatinum; [1-(2'-anthracenyl)-3-methylcyclopentadienyl]trimethylsilylmethylplatinum; [(2'-anthracenyl)cyclopentadienyl]trimethylsilylmethylplatinum; [(1'-pyrenyl)cyclopentadienyl]trimethylsilylmethylplatinum; [1-methyl-3-(1'-pyrenyl)cyclopentadienyl]trimethylsilylmethylplatinum, and the like.

The catalyst can be provided in any amount sufficient to convert the composition to a tack-free state. In embodiments, the catalyst is provided in an amount sufficient to provide the platinum in an amount of from about 50 to about 150 ppm, about 60 to about 120 ppm, about 75 to about 100 ppm, or about 80 to about 90 ppm.

The acid-anhydride functionalized polysiloxane is, in one embodiment, selected from an acid-anhydride functionalized polysiloxane such as described in International Patent Application PCT/EP2019/074418 filed on Sep. 12, 2019, the disclosure of which is incorporated herein by reference in its entirety. In one embodiment, the acid-anhydride functionalized polysiloxane polymer can be selected from a compound represented by the formula (III):

$$M^{5A}D^5_oD^{6A}_pD^{7H}_qM^{5A} \qquad (III)$$

where $M^{5A}$ is $(R^{21})(R^{22})(R^{23})SiO_{1/2}$
$D^5$ is $(R^{24})(R^{25})SiO_{2/2}$,
$D^{6A}$ is $(R^{26})(R^{27})SiO_{2/2}$
$D^{7H}=(R^{28})(H)SiO_{2/2}$
where $R^{21}$, $R^{22}$, $R^{24}$, $R^{25}$, $R^{26}$, and $R^{28}$ are each independently a C1-C10 saturated hydrocarbon radical; $R^{23}$ and $R^{27}$ each independently represents an acid-anhydride functional group that may be derived from the reaction of allyl succinic anhydride with Si(H) functionality; o+q is 10-40, and p is 1-20. In embodiments, $R^{21}$, $R^{22}$, $R^{24}$, $R^{25}$, $R^{26}$, and $R^{28}$ are a C1-C10 alkyl, a C2-C8 alkyl, or a C4-C6 alkyl. In one embodiment, $R^{21}$, $R^{22}$, $R^{24}$, $R^{25}$, $R^{26}$, and $R^{28}$ are each methyl. The acid anhydride functional polysiloxane may be referred to herein as polymer AA.

The acid-anhydride functional siloxane is present in an amount of about 0.1 parts to about 10 parts, from about 0.5 to about 7.5 parts, or from about 1 to about 5 parts based on the weight of the composition.

The coating composition may optionally include one or more other additives as desired for a particular purpose or intended application. Examples of suitable additives include, but are not limited to, for example, inhibitors, stabilizers, inert fillers, resin like polyorganosiloxanes other than the hydride functional or vinyl functional polysiloxanes previously described, nonreinforcing fillers, adhesion promoters, fungicides, fragrances, rheological additives, corrosion inhibitors, antioxidants, light stabilizers, flame retardants, agents for influencing the electrical properties, dispersing assistants, solvents, pigments, dyes, plasticizers, organic polymers, heat stabilizers, etc.

In one embodiment, the composition may include a sensitizer as an additive. The sensitizer is a material that absorbs specific active energy rays and in an electron excited state. Examples of the suitable sensitizers that can be used include, but are not limited to, benzophenone, thioxanthone, isopropylthioxanthone, anthraquinone, a 3-acylcoumarin derivative, terphenyl, styrylketone, 3-(aroylmethylene) thiazoline, camphorquinone, eosin, rhodamine, and erythrosine.

An example of a suitable resinlike polyorganosiloxane includes a hydroxy functional polysiloxane having an —OH group attached to a silicon atom, which may be referred to as silanols or silanol resins. The silanol functionality may be at the terminal position or attached to a silicon atom in the siloxane chain. The silanol resins can be of the MDTQ type. In one embodiment, the silanol resin is a silanol chain-stopped polysiloxane with the silanol functionality at the terminal positions. In one embodiment, the silanol resins can have a viscosity of from about 25 to about 10,000 cPs at 25° C., from about 50 to about 7,500 cPs at 25° C., from about 100 to about 5,000 cPs at 25° C., from about 500 to about 2,500 cPs at 25° C., or from about 1,000 to about 2,000 cPs at 25° C.

Some examples of suitable additives can include activated carbon, finely ground quartz, diatomaceous earth, clays, chalk, lithopones, carbon blacks, graphite, metal oxides, metal carbonates, metal sulfates, metal salts of carboxylic acids, metal dusts, fibers, such as, for example, glass fibers, plastics fibers, plastics powders, metal dusts, dyes, pigments, etc.

Process for Forming a Coating from the Compositions

The coating composition can be used to form a coating on a substrate. The coating is formed by applying the coating composition onto a surface of a substrate and exposing the coating to UV radiation to cure the composition.

The photocurable composition can be applied to a substrate by any suitable method such as, for example, by roll-coating, or alternatively, by spraying from a suitable applicator (e.g., a nozzle), wherein the applicator can be still or moving with respect to the substrate. Though misting or aerosoling is often caused predominantly by movement of the applicator with respect to a substrate, misting or aerosoling can be caused by factors other than movement of the applicator or substrate. For example, misting can be caused partially or predominantly by the method of application rather than by any motion of the applicator relative to the substrate, e.g., in a stationary or slow spraying process.

The photocurable compositions can be applied to the substrate in any amount or thickness as desired for a particular purpose or intended application. It will be appreciated that thicker coatings may require longer cure times. In one embodiment, the photocurable composition is applied to the substrate at a coating weight of from about 0.5 to about 2 grams per square meter (gsm), about 0.75 to about 2 gsm, or about 1 to about 1.75 gsm.

The UV light source may provide light in the range of about 200 nm to about 400 nm in wavelength. UV light sources that can be used for curing the composition include, but are not limited to, an electrodeless UV lamp, an H-type mercury vapor bulb, a D-type iron doped mercury vapor bulb, a V-type bulb, an X-type bulb, etc. The size of the lamp can be selected as desired for a particular purpose or to provide a desired curing effect.

Additionally, the process and system to implement the process can employ one or more reflectors or other suitable devices to focus the UV light. The type and number of such reflectors can be selected as desired to focus the light energy to a selected degree during the coating/curing process. In one embodiment, the reflector can be a dichroic reflector.

In one embodiment, the method of curing the composition comprises first exposing the composition and the substrate to which it is applied to heat prior to exposure to the UV light source. Heat can be provided by any suitable device or method for applying heat. In one embodiment, heat may be provided by an oven such as a convection oven or forced air oven. In another embodiment, the heat may be provided by an infrared light source such as an LED light source emitting greater than 800 nm wavelength or a "black body" type of heat lamp. Such an infrared light source can be focused on the moving coated substrate at a point prior to where the UV light source is placed such that the coated substrate has been heated above ambient temperature to a temperature of from about 25° C. to about 120° C. at the time the UV lamp emission is focused on the coating. The temperature of the heat source should be relatively mild. In embodiments, the coated substrate is heated to a temperature of from about 25° C. to about 120° C., from about 40° C. to about 105° C., or from about 50° C. to about 90° C.

The substrate coated with the curable composition is generally moved continuously through the system via a conveyor belt or other suitable device to transport the coated substrate. The coated substrate can be moved through the system and exposed to the curing conditions at any speed suitable to expose the curable composition to the UV light (and/or the heat source) to effectively promote curing of the composition. In one embodiment, the substrate carrying the silicone composition is conveyed through the system at a speed of from about 20 feet per minute to about 1,000 feet per minute, about 50 feet per minute to about 750 feet per minute, about 100 feet per minute to about 500 feet per minute, or from about 200 to about 400 feet per minute.

Articles

The articles formed from the process comprise a substrate having a coating formed from the composition disposed on a surface of the substrate. The substrate can be any substrate on which a coating of the above coating formulation is desired. Some examples of suitable substrates include paper, cardboard, wood products, polymer and plastic products, glass products, and metal products.

The coatings formed from the photocurable compositions may be suitable for use in forming a release coating. The coatings exhibit release properties on such substrates such as engineering paper, asphalt package paper, different releasing double-surface peeling paper, etc., as well as tapes, labels, etc., which require an appropriate level of releasing property.

Release liners or layers such as those used in adhesive article constructions, e.g., labels, tapes, etc., are often formed from cellulose based substrates. Examples of substrates that may be coated with the curable silicone composition include, but are not limited to, cellulose-based substrates, such as papers, such as glassine, super-calendared Kraft (SCK) paper and clay-coated kraft (CCK) paper, and film substrates including polyethylene, polypropylene, and polyester and hybrid substrates, such as those comprising polyethylene-Kraft paper (PK) or polypropylene-Kraft paper (PPK).

EXAMPLES

In order that those skilled in the art will be better able to practice the invention, the following examples are given by way of illustration and not by way of limitation. All parts are by weight unless otherwise indicated.

Example 1A

A UV light curable silicone coating formula A was prepared having 91.6 parts of a vinylsilicone of composition $M^{(Vi)}D_{80}M^{(Vi)}$, 8.4 parts of the acid anhydride functional polymer AA 7.2 parts of a hydride functional silicone crosslinker of composition $[M^{(H)}]_2Q$, and sufficient [MeCp]PtMe$_3$ catalyst to provide about 85 ppm platinum in the coating bath (not including crosslinker). This coating mixture was manually applied to Verso 40 lb/ream basis weight SCK sheets using a 0 Meyer rod to provide about 2-6 g/m2 laydown. Coated sheets were then passed under a single focused 13 mm diameter Heraeus™ 300 watt/in H+ lamp (medium pressure mercury vapor type) mounted atop a lab UV Processor equipped with an adjustable speed conveyer belt. Cure was qualitatively determined as a function of conveyer line speed on the basis of smear, silicone migration to cellophane test tape, and anchorage to the SCK sheet. It was found that excellent cure was obtained (no smear, no silicone migration, nor rub-off from substrate) at conveyer speeds up to 30 ft/minute (fpm). Increasing conveyer speed to 40 fpm resulted in some migration that rapidly subsided as the cured coating aged following UV exposure. Higher conveyer speeds resulted in incomplete cure that slowly improved after a few minutes post-exposure. The coating technique of this example led to thicker cured silicone coated samples than are typically produced in commercial production of silicone release liners.

Example 1B

The silicone formula A was manually applied to Verso SCK as described in example 1, but in this case a 13 mm 300 watt/in diameter Heraeus D lamp (iron doped medium pressure mercury vapor type) was substituted for the H+ lamp. An R500 reflector type that does not attenuate long wavelength lamp emission was used to focus UV light at the coating surface. Coated sheets were passed under the focused D lamp at different conveyer speeds, with results noted below:

| Conveyer Speed, fpm | Qualitative Cure |
|---|---|
| 80 | excellent; no smear, no migration, good anchorage |
| 120 | well cured; slight smear, no migration, good anchorage |
| 150 | undercure; some migration observed, postcures |

A dramatic improvement in cure speed (>3×) was obtained by replacing the H+ lamp with a comparable D lamp. The D lamp emission is red-shifted to longer wavelengths than the H+ emission, which appeared to improve photocure efficiency of MeCpPtMe$_3$.

Example 1C

Silicone formula A was manually applied to Verso SCK sheet as in previous examples but in this case a Dichroic+ Reflector was substituted for the R$^{500}$ reflector. Dichroic reflectors reduce long wavelength (visible and IR light) emission focused on the sample compared with conventional R$^{500}$ type reflectors, and increase relative amounts of shorter wavelength emission. Coated sheets were then passed beneath the focused D lamp at different conveyer speeds, with observations noted below:

| Conveyer Speed, fpm | Qualitative Cure |
|---|---|
| 80 | Excellent cure; no migration, no smear, good anchorage |
| 120 | Excellent cure |
| 150 | Good cure; slight migration, coating mars, good anchorage |
| 180 | Undercured; smear and migration noted, rapid post-cure |

Switching to Dichroic reflectors unexpectedly provided additional improvement in photocure response of this system.

Example 1D

Silicone formula A was manually applied to Verso SCK sheet samples as described above, but in this case the applied coating was passed under two focused 13 mm diameter D lamps mounted in tandem. Observations are noted below:

| Conveyer Speed, fpm | Qualitative Cure |
|---|---|
| 200 | Excellent cure; no migration, no smear, good anchorage |
| 250 | Well cured; no migration, no smear, hard rub-off |
| 275 | Well cured; slight migration, slight smear, hard rub-off |
| 300 | Undercured; some smear and migration extant, rapid post-cure |

Example 1E

A Silicone formula B was formulated as 99.0 parts of $M^{(Vi)}D_{80}M^{(Vi)}$ polymer, 1.0 part of the acid anhydride functional polymer AA including sufficient MeCpPtMe$^3$ catalyst to provide 85 ppm platinum, and 8.3 parts of [MeH]$_2$Q crosslinker. Formula B differed from formula A in that the amount of acid anhydride functional silicone polymer was reduced to ~1% (w/w). Cure studies were conducted using Verso SCK substrate as described in previous examples.

| Conveyer Speed, fpm | Qualitative Cure |
|---|---|
| 150 | Excellent Cure; no migration, no smear, good anchorage |
| 250 | Excellent Cure; no migration, no smear, good anchorage |
| 300 | Well cured; slight migration, no smear, good anchorage |
| 350 | Undercured; migration noted that rapidly improved on post-cure |

Further improvement in cure performance was obtained by reducing the concentration of acid-anhydride functional silicone additive from 8.5% to 1%.

Example 1F

A silicone formula C was prepared that was identical to formula B except that no acid-anhydride functional silicone polymer AA was present. For purposes of the present technology, Example 1F is considered a comparative example. Cure assessment was carried out in a manner identical to Examples 1A-1E.

| Conveyer Speed, fpm | Qualitative Cure |
|---|---|
| 150 | Cured; no migration, no smear, but poor anchorage (easy rub-off) |
| 250 | Undercured; smeary surface and poor anchorage that did not improve on post-cure. |

Example 1G

A silicone formula D was prepared that was identical to formula B except that the MeCpPtMe$_3$ catalyst concentration was reduced to provide 50 ppm Pt. Cure assessment results are noted below.

| Conveyer Speed, fpm | Qualitative Cure |
|---|---|
| 100 | Cured, slight migration and smear. Post-cure observed |
| 150 | Undercure; migration and smear that improved on post-cure |
| 200 | Undercure; migration and smear with good anchorage |

Examples 1A-1G demonstrate several ways in which photo-hydrosilylation cure of vinylsilicone and a hydride-silicone based coating with R'CpPtR'$_3$ catalyst can be markedly improved. Improved curing and product was observed using an iron-doped mercury vapor lamps such as the Heraeus 'D' type in place of standard 'H' type mercury vapor lamps. Equipping the lamp housing with dichroic type reflectors is another option for tuning or improving the cure. Finally, optimizing the content of the acid anhydride functional silicone polymer additive also contributed to improvement in cure speed and stability.

Example 2

A series of experiments was carried out in which photo-hydrosilylation cure of different silicone formulations based on the same $M^{(Vi)}D_{80}M^{(Vi)}$ vinylsilicone polymer, $[M^{(H)}]_2Q$ crosslinker, and acid anhydride functional silicone polymer AA described in examples 1A through 1G was studied as a function of MeCpPtMe$_3$ catalyst concentration, mole concentration of ITX (2-isopropylthioxanthone) as a % of MeCpPtMe$_3$ molarity, lamp type and number of lamps, and coating line speed. 1% of acid anhydride functional polymer AA was present in all coatings tested. A quartz shield separating lamps from the samples being cured was either present or absent. These experiments were carried out on a pilot coating line equipped with a five-roll film splitting silicone coater capable of laying down 1 to 2 micron thick defect-free coatings. UV curing radiation was provided by either 2 or 4 banks of focused Hereaus microwave fired 600 watt/inch D or H type UV lamps. Dichroic reflectors were mounted in all experimental runs.

Silicone coat weight was assessed using the XRF technique common to the silicone liner industry. Silicone was applied to the Verso SCK described in examples 1A-1G. Qualitative cure of samples was noted immediately off line with postcure also observed. For these experiments, quality of cure was assigned a numerical ranking, with 0 denoting no cure up to 4 denoting excellent cure. From a commercial perspective, a rating of 3 or 4 would be considered acceptable performance. In the table below, only those runs yielding a qualitative cure of 3 or better are included for simplicity. It should be noted that 1 micron coating thickness is ~1 g/m2

TABLE 1

| Coating mol % | ppm Pt | Lamps | Line Speed fpm | Ct. Wt, gsm | Q-shield | Cure | ITX |
|---|---|---|---|---|---|---|---|
| 2A | 50 | 4 × D | 100 | 1.20 | Yes | 3 | 0 |
| 2B | 80 | 4 × D | 300 | 1.10 | Yes | 3 | 0 |
| 2C | 85 | 4 × D | 300 | 1.20 | Yes | 4 | 0 |
| 2D | 100 | 4 × D | 300 | 1.27 | Yes | 4 | 0 |
| 2D | 100 | 4 × D | 600 | 1.33 | Yes | 3 | 0 |
| 2E | 120 | 4 × D | 600 | 1.35 | Yes | 4 | 0 |
| 2E | 120 | 2 × D | 100 | 1.27 | Yes | 3 | 0 |
| 2G | 85 | 4 × D | 300 | 1.26 | Yes | 4 | 20 |
| 2H | 85 | 4 × D | 300 | 1.26 | Yes | 4 | 50 |
| 2J | 100 | 4 × D | 600 | 1.27 | Yes | 3 | 50 |
| 2K | 100 | 2H + 2D | 300 | 1.30 | Yes | 3 | 50 |
| 2K | 100 | 2 × H | 200 | 1.40 | Yes | 4 | 50 |
| 2K | 100 | 2 × D | 200 | 1.40 | Yes | 3 | 50 |
| 2K | 100 | 2 × D | 300 | 1.35 | NO | 3 | 50 |
| 2K | 100 | 2 × H | 200 | 1.42 | NO | <3 | 50 |
| 2K | 100 | 2H + 2D | 300 | 1.35 | NO | 3 | 50 |
| 2K | 100 | 4 × D | 600 | 1.40 | NO | 3 | 50 |
| 2L | 85 | 4 × D | 500 | 1.35 | NO | 3 | 0 |
| 2O | 85 | 4 × D | 500 | 1.29 | NO | 3 | 100 |
| 2P* | 85 | 4 × D | 500 | 1.27 | NO | 3 | 50 |

*High SiH/Vinyl ratio (2x normal crosslinker level)

Example 2 is an extensive series of experiments carried out in a fashion that mimics commercial production of silicone-coated release liners. The biggest difference between Example 1 and Example 2 is the much thicker silicone coating put down by manual use of a #0 Meyer rod in the experiments described in Example 1. The multi-roll high speed silicone coater on the pilot line used for Example 2 experiments is the same type of coater found on commercial silicone coating lines. Sample coatweights of 0.8-2.0 gsm on the Verso SCK are representative of the micron scale silicone thickness of industrial release liners, and cure evaluation of these samples gives a realistic assessment of how changes in silicone formulation and processing affect quality and commercial viability of the photo-activated hydrosilylation cured silicone liners.

Example 2 shows that 500-600 fpm processing line speed under the conditions described above was achieved with a sufficient quantity of MeCpPtMe$_3$ to furnish about 100 ppm Pt to the coating formula. The data also shows that D lamps may be a better fit to MeCpPtMe$_3$ photochemistry than H lamps in the absence of sensitizer, but that addition of ITX sensitizer marginally improves system performance if H lamps are in use. Good anchorage of cured silicone to the Verso SCK sheet was observed in all trial runs. Removal of quartz shields improves cure to some extent, all other things being equal.

Example 3

A third set of experiments was carried out on the same pilot coating line described above in Example 2. In this case, different SiH-functional silicone crosslinker polymers were blended with two different vinyl-endstopped linear polydimethyl siloxane base polymers. Concentrations of MeCpPtMe$_3$ providing 60 to 120 ppm platinum were blended in with the curable silicone mixture, and between 0 to 0.5% of acid anhydride functional silicone polymer AA was also present in the coating formulations. None of the formulations included ITX sensitizer. The ratio of reactive SiH/vinyl siloxane was varied between 2.0 and 2.5. As in Example 2, line speed and silicone coat weight were varied and the degree of cure was qualitatively assessed as previously described and in addition, samples of cured silicone liner were quantitatively assessed for cure by determination of weight % of extractable silicone present within a couple of minutes of exposure to focused UV light. Extractions were carried out on precisely measured small areas of liner placed in methyl isobutyl ketone solvent for several days before analysis of extractant liquid by atomic absorption technique. All experiments were carried out with 4 banks of 600 watt/in powered Hereaus microwave fired D lamps equipped with dichroic reflectors. These experiments varied silicone formulations, substrates, and processing conditions to evaluate different processing conditions of UV-activated addition cured release liners.

Formulations, processing conditions, qualitative cure, and % extractable silicone for selected trial runs resulting in well cured silicone coatings are presented in the following tables. Vinyl base polymer 1 has the structure $M^{(Vi)}D_{114}M^{(Vi)}$; Vinyl base polymer 2 has the structure $M^{(Vi)}D_{149}M^{(Vi)}$; a silanol-stopped polymer has the structure $HO(Me)_2SiO\text{-}D_{230}\text{—}OSi(Me_2)OH$. Crosslinker 3 has a linear structure $MD(H)_aD_bM$ where $D(H)=(CH_3)(H)SiO$, and where a and b are integers between 10 and 30. Crosslinkers 4, 5, and 6 are blends of crosslinker 3 with a homopolymer of structure $MD^{(H)}{}_cM$, where c is an integer between 20 and 40. Crosslinker 3 includes about 0.8% reactive hydride; crosslinker 4 includes about 1.04% hydride; crosslinker 5 includes about 0.96% reactive hydride, and crosslinker 6 includes about 0.88% reactive hydride. The substrate is Verso SKP sheet (a supercalendared kraft) and the level of anhydride functional polymer AA is maintained at 0.5 wt % in all results summarized in Table 2.

TABLE 2

| Coating | Base Polymer | Crosslinker | SiH/Vinyl | ppm Pt | Line Speed | Ct. Wt, gsm | Cure | % Extract |
|---|---|---|---|---|---|---|---|---|
| 3A | 1 | 3 | 2.0 | 100 | 200 | 1.64 | 4 | 3.0 |
| 3A | 1 | 3 | 2.0 | 100 | 400 | 1.77 | 3 | 3.7 |
| 3A | 1 | 3 | 2.0 | 100 | 600 | 1.59 | 3 | 5.0 |
| 3B | 1 | 3 | 2.0 | 120 | 200 | 1.77 | 4 | 3.0 |
| 3B | 1 | 3 | 2.0 | 120 | 400 | 1.80 | 4 | 2.9 |
| 3B | 1 | 3 | 2.0 | 120 | 600 | 1.72 | 4 | 3.0 |
| 3D | 1 | 3 | 2.5 | 80 | 200 | 1.79 | 4 | 3.4 |
| 3D | 1 | 3 | 2.5 | 80 | 400 | 1.74 | 3 | 3.9 |
| 3D | 1 | 3 | 2.5 | 80 | 600 | 1.69 | 3 | 4.2 |
| 3E | 1 | 3 | 2.5 | 100 | 200 | 1.77 | 4 | 2.9 |
| 3E | 1 | 3 | 2.5 | 100 | 400 | 1.80 | 4 | 2.6 |
| 3E | 1 | 3 | 2.5 | 100 | 600 | 1.79 | 3 | 2.9 |
| 3C | 1 | 3 | 2.3 | 100 | 200 | 1.79 | 4 | 3.1 |
| 3C | 1 | 3 | 2.3 | 100 | 400 | 1.77 | 4 | 3.9 |
| 3C | 1 | 3 | 2.3 | 100 | 600 | 1.71 | 3 | 4.2 |
| 3D | 1 | 3 | 2.5 | 80 | 200 | 1.79 | 4 | 3.3 |
| 3D | 1 | 3 | 2.5 | 80 | 400 | 1.77 | 4 | 3.9 |
| 3D | 1 | 3 | 2.5 | 80 | 600 | 1.79 | 4 | 4.2 |

The data in Table 2 demonstrates that the concentration of MeCpPtMe$_3$ (expressed as ppm Pt) and the relative mole ratio of reactive SiH/vinyl can affect qualitative and quantitative crosslinking density, as expressed in cure rank and percent extractable siloxane, respectively. For example, a combination of 80 ppm Pt with an SiH/vinyl ratio of 2.5 or of 120 ppm Pt with an SiH/vinyl ratio of 2.0 leads to excellent cure and low extractables at processing speeds of 200-600 fpm. In general, commercial thermally processed solvent-free addition cure silicone release agents are considered well cured and stable on contact with adhesives if the percent extractable siloxane is 500 or less; in most cases percent extractables of 5-10% will post-cure below 5% within a short time after oven exposure. So, on that basis it is apparent that selection of base polymer 1 and crosslinker polymer 3 combined with 0.5% acid anhydride functional additive polymer affords some flexibility in concentration of UV-activated catalyst and ratio of crosslinker/vinyl silicone base polymer in the processing of release liners on a typical SCK substrate.

A set of experiments was then carried out to determine the effect of crosslinker hydride content on degree of addition cure of UV-activated platinum catalyzed release coating formulations. Formulations, processing conditions and results are noted in Table 3. The substrate is Verso SKP.

TABLE 3

| Coating | Base Polymer | Crosslinker | SiH/Vinyl | ppm Pt | Line Speed | Ct. Wt., gsm | Cure | % Extract |
|---|---|---|---|---|---|---|---|---|
| 3C | 1 | 3 | 2.3 | 100 | 200 | 1.79 | 4 | 3.1 |
| 3C | 1 | 3 | 2.3 | 100 | 400 | 1.77 | 4 | 3.9 |
| 3C | 1 | 3 | 2.3 | 100 | 600 | 1.71 | 3 | 4.2 |
| 3T | 1 | 4 | 2.3 | 100 | 200 | 1.80 | 4 | 7.2 |
| 3T | 1 | 4 | 2.3 | 100 | 400 | 1.77 | 4 | 12.9 |
| 3T | 1 | 4 | 2.3 | 100 | 600 | 1.8 | 4 | 14.0 |
| 3T | 1 | 4 | 2.3 | 100 | 800 | 1.77 | 2.5 | 22.0 |
| 3D | 1 | 3 | 2.5 | 80 | 200 | 1.79 | 4 | 3.4 |
| 3D | 1 | 3 | 2.5 | 80 | 400 | 1.74 | 3 | 3.9 |
| 3D | 1 | 3 | 2.5 | 80 | 600 | 1.69 | 3 | 4.2 |
| 3J | 1 | 4 | 2.5 | 80 | 200 | 1.77 | 4 | 7.5 |
| 3J | 1 | 4 | 2.5 | 80 | 400 | 1.82 | 4 | 13.0 |
| 3J | 1 | 4 | 2.5 | 80 | 600 | 1.75 | 3 | 14.4 |
| 3J | 1 | 4 | 2.5 | 80 | 800 | 1.54 | 2 | 22.5 |

It appears there is a response from the UV-activated Pt catalyzed system to H content of the crosslinker (either single polymer or blend). A modest increase in H content from crosslinker 3 (0.8% H) to crosslinker 4 (1.04% H) results in a large increase in % extractable silicone regardless of catalyst concentration or H/vinyl ratio. Qualitative cure rank of 3 to 4 is maintained if extractable silicone is maintained <15%.

The next set of experiments included two different base polymers and two levels of polymer AA, either 0 or 0.5%. Catalyst concentration was 100 ppm and SiH/vinyl is 2.3:1 throughout.

TABLE 4

| Coating | Base Polymer | Crosslinker | Polymer AA | Line speed | Ct. Wt., gsm | Cure | % Extract |
|---|---|---|---|---|---|---|---|
| 3H | 1 | 4 | 0.5% | 200 | 1.80 | 4 | 4.7 |
| 3H | 1 | 4 | 0.5% | 400 | 1.84 | 4 | 6.8 |
| 3H | 1 | 4 | 0.5% | 600 | 1.79 | 4 | 8.9 |
| 3L | 2 | 4 | 0.5% | 200 | 1.82 | 4 | 14.4 |
| 3L | 2 | 4 | 0.5% | 400 | 1.77 | 3 | 19.9 |
| 3L | 2 | 4 | 0.5% | 600 | 1.77 | 3 | 23.8 |
| 3I | 1 | 4 | 0 | 200 | 1.79 | 4 | 7.2 |
| 3I | 1 | 4 | 0 | 400 | 1.85 | 4 | 10.2 |
| 3I | 1 | 4 | 0 | 600 | 1.79 | 3 | 14 |
| 3M | 2 | 4 | 0 | 200 | 1.79 | 4 | 12.2 |
| 3M | 2 | 4 | 0 | 400 | 1.79 | 3 | 23 |
| 3M | 2 | 4 | 0 | 600 | 1.71 | 2 | 30.5 |

In this case, base polymer 2, which is a higher MW vinyl-stopped polydimethylsiloxane than base polymer 1, did not provide for as complete a cure. Additionally, the presence of 0.5% a polymer AA significantly aids completeness of cure as evidenced by lower extractables and higher cure rank for coatings 3H and 3L versus 3I and 3M, respectively.

To better define the relationship between MeCpPtMe$_3$ concentration and photocure efficacy of vinylsiloxane-hydridosiloxane crosslinking reactions, a series of trial runs were made using base polymer 1 and crosslinker 4 with 0.500 polymer AA included, at 4 different catalyst concentrations with SiH/vinyl of 2.3. Coatings were applied to Verso SKP at different line speeds then exposed to 4 banks of Heraeus D lamps as before. Cure rank and % extractable siloxane were measured. Results are displayed in Table 5.

TABLE 5

| Coating | Base Polymer | Crosslinker | ppm PT | Line Speed fpm | Cure | % Extract |
|---|---|---|---|---|---|---|
| 3R | 1 | 4 | 120 | 200 | 4 | 4 |
| 3R | 1 | 4 | 120 | 400 | 4 | 4.2 |
| 3R | 1 | 4 | 120 | 600 | 4 | 5 |
| 3R | 1 | 4 | 120 | 800 | 4 | 7.2 |
| 3S | 1 | 4 | 100 | 200 | 4 | 4 |
| 3S | 1 | 4 | 100 | 400 | 4 | 5 |
| 3S | 1 | 4 | 100 | 600 | 4 | 7 |
| 3S | 1 | 4 | 100 | 800 | 3 | 9 |
| 3T | 1 | 4 | 80 | 200 | 4 | 7.2 |
| 3T | 1 | 4 | 80 | 400 | 4 | 12.9 |
| 3T | 1 | 4 | 80 | 600 | 4 | 14 |
| 3T | 1 | 4 | 80 | 800 | 2 | 22 |
| 3U | 1 | 4 | 60 | 200 | 4 | 9 |
| 3U | 1 | 4 | 60 | 400 | 3.5 | 15.6 |
| 3U | 1 | 4 | 60 | 600 | 3 | 20 |
| 3U | 1 | 4 | 60 | 800 | 2 | 27.5 |

Catalyst concentration of less than 100 ppm coupled with the high SiH crosslinker 4 led to high extractable siloxane at highest line speeds, consistent with previous examples. Next, the lowest catalyst concentration coating (60 ppm Pt) was used to further study cure efficacy of this system applied to Verso SKP paper as a function of hydride content of crosslinker. Processing conditions, polymer AA loading, and SiH/vinyl of 2.3 were maintained in all formulations described in Table 6.

TABLE 6

| Coating | Base Polymer | Crosslinker | Xlink % H | Line Speed | Cure | % Extract |
|---|---|---|---|---|---|---|
| 3U | 1 | 4 | 1.04 | 200 | 4 | 9 |
| 3U | 1 | 4 | 1.04 | 400 | 3.5 | 15.6 |
| 3U | 1 | 4 | 1.04 | 600 | 3 | 20 |
| 3U | 1 | 4 | 1.04 | 800 | 2 | 27.5 |
| 3V | 1 | 3 | 0.8 | 200 | 4 | 4 |
| 3V | 1 | 3 | 0.8 | 400 | 3.5 | 5.5 |
| 3V | 1 | 3 | 0.8 | 600 | 3.5 | 6 |
| 3V | 1 | 3 | 0.8 | 800 | 3 | 7 |
| 3W | 1 | 5 | 0.96 | 200 | 4 | 5 |
| 3W | 1 | 5 | 0.96 | 400 | 3.5 | 7.7 |
| 3W | 1 | 5 | 0.96 | 600 | 3.5 | 12 |
| 3W | 1 | 5 | 0.96 | 800 | 2.5 | 20.5 |
| 3X | 1 | 6 | 0.88 | 200 | 4 | 6 |
| 3X | 1 | 6 | 0.88 | 400 | 3.5 | 11 |
| 3X | 1 | 6 | 0.88 | 600 | 3 | 17.7 |
| 3X | 1 | 6 | 0.88 | 800 | 2.5 | 21.5 |

Cure rank and % extractable silicone were inversely related to % reactive hydride (SiH) present in the crosslinker, with the largest performance difference observed between Crosslinkers 3 and 4. Intermediate hydride levels of crosslinkers 5 and 6 led to extractable levels for cured coatings 3W and 3X that were between those of 3U and 3V. Following these trials, photocure of the formulation 3U (60 ppm Pt catalyst loading applied at ~1.6-1.7 gsm) was examined on several different paper substrates, with results depicted in Table 7. The Kruger sheets are supercalendered kraft types.

TABLE 7

| Coating | Base Polymer | Crosslinker | Substrate | Line speed fpm | Cure | % Extract |
|---|---|---|---|---|---|---|
| 3U | 1 | 4 | Verso SKP | 200 | 4 | 9.0 |
| 3U | 1 | 4 | Verso SKP | 400 | 3.5 | 15.6 |
| 3U | 1 | 4 | Verso SKP | 600 | 3 | 20.0 |
| 3U | 1 | 4 | Verso SKP | 800 | 2 | 27.5 |
| 3U | 1 | 4 | Kruger 18121 | 200 | 4 | 7.0 |
| 3U | 1 | 4 | Kruger 18121 | 400 | 4 | 11.0 |
| 3U | 1 | 4 | Kruger 18121 | 600 | 4 | 15.6 |
| 3U | 1 | 4 | Kruger 18121 | 800 | 3.5 | 19.4 |
| 3U | 1 | 4 | Kruger 18121 | 200 | 4 | 6.8 |
| 3U | 1 | 4 | Kruger 18121 | 400 | 4 | 10.2 |
| 3U | 1 | 4 | Kruger 18121 | 600 | 4 | 12.7 |
| 3U | 1 | 4 | Kruger 18121 | 800 | 3.5 | 16.0 |
| 3U | 1 | 4 | UPM G58 Glassine | 200 | 4+ | 4.0 |
| 3U | 1 | 4 | UPM G58 Glassine | 400 | 4+ | 7.3 |
| 3U | 1 | 4 | UPM G58 Glassine | 600 | 4+ | 10.1 |
| 3U | 1 | 4 | UPM G58 Glassine | 800 | 4 | 12.0 |

This data demonstrates that certain paper substrates available from different vendors are very well suited for use with the UV-activated MeCpPtMe$_3$ photo-hydrosilylation catalyst system. For example, qualitative cure and reduced extractable silicone were obtained with glassine sheet at 800 fpm line speed with 60 ppm Pt concentration on irradiation with 4 banks of D lamps as described above.

A trial of an Evergreen poly-coated kraft (low-density polyethylene coated on unbleached kraft paper) with the same 3U silicone formulation applied at 1.5 gsm laydown was conducted at a line speed of 400 fpm to yield well-cured silicone coatings with excellent anchorage to the polykraft liner substrate without damage to the polyethylene layer. It should be noted that thermal addition cure silicone release agents are difficult to cure on PK liner at temperatures that do not degrade and melt polyethylene thus demonstrating that photocurable silicone systems employing vinylsilicone base polymers and SiH crosslinkers with MeCpPtMe$_3$ catalyst are particularly well suited for use on polykraft substrates.

Two coating formulations that included the silanol-stopped polymer were also tested for qualitative cure: 3N employs 90 parts vinyl-stopped polymer 1, 10 parts silanol-stopped polymer HO(Me)$_2$SiO-D$_{230}$-OSi(Me$_2$)OH, 0.5 parts of Polymer AA, 100 ppm Pt as MeCpPtMe$_3$, and sufficient crosslinker 4 to provide a SiH/vinyl ratio of 2.3. 3O is a 75/25/0.5 analog of 3N. The 3N coating cure rank was assessed at 4.0 applied to Verso SKP sheet at 600 fpm line speed. 3O coating cure rank was judged to be 3.0 also at 600 fpm line speed. These results confirmed that silanol stopped polydimethylsiloxane fluids or gums can be used as additives to modify release characteristics, coverage, or other performance properties of these photocurable addition cure formulations. Platinum hydrosilylation catalysts are known to catalyze SiOH+SiH→SiOSi+H$_2$ condensation, and MeCpPtMe$_3$ is no exception.

Example 4

The laboratory scale UV-processor described in above examples 1A, 1B, 1C, 1D, 1E, 1F, and 1G was utilized to provide qualitative cure assessments (ranked as in previous examples) of combinations of curing lamps that included a monochromatic 385 nm emission LED source. A curable silicone formula consisting of M$^{(Vi)}$D$_{115}$M$^{(Vi)}$+MD$^{(H)}_n$D$_m$M (0.8% H content) with 100 ppm Pt derived from MeCpPtMe$_3$ and H/vinyl ratio of 2 was prepared. 0.5 wt % of polymer AA was also present. The lamp combinations included the LED curing lamp array by itself and in combination with 13 mm and 9 mm diameter microwave fired D lamps equipped with dichroic reflectors. Hand draw-downs on Verso SKP sheet samples with coatweights averaging around 1.3 gsm were exposed to focused curing lamps at different conveyer line speeds. Experiments and observations are noted in Table 8.

TABLE 8

| Lamps | Conveyer Speed, fpm | Qualitative Cure Rank |
| --- | --- | --- |
| 385 nm LED | 3 × 50 | 0 |
|  |  | (no cure) |
| 13 mm D lamp | 50 | 3.5 |
| LED + 13 mm D | 50 | 4 |
| 13 mm D lamp | 100 | 3 |
| LED + 13 mm D | 100 | 4 |
| 13 mm D lamp | 200 | 1.5 |
| LED + 13 mm D | 200 | 2.5 |
| 9 mm D lamp | 100 | 3.5 |
| LED + 9 mm D | 100 | 4 |
| LED + 9 mm D | 200 | 3.5 |
| 9 mm D + LED | 200 | 2.5 |
|  |  | (reverse lamp order) |

As shown in Example 4 hand draw-downs on the lab UV processor, while exposure to 385 nm wavelength LED emission does not initiate photo-hydrosilylation cure of this coating, exposure to 385 nm LED light prior to exposure with an iron-doped mercury vapor (D) lamp provides for faster cure than the D lamp by itself. The sharper focus of the narrower 9 mm diameter D bulb promotes significantly better cure of the coating than observed with 13 mm diameter lamp. The inferior cure observed when D lamp exposure preceded LED lamp exposure suggests that the thermal output of the LED source is more important to system cure than 385 nm absorption by the catalyst.

Example 5

A series of photo-DSC experiments were carried out using a TA Instruments differential scanning calorimeter equipped with a UV lamp for irradiation of samples to determine how pre-heating a curable blend of vinylsilicone base polymer 1 and hydride crosslinker polymer 3 prior to exposure to UV light would affect photocure speed. A programmed experimental sequence was carried out consisting of the following steps: 1) equilibration step to establish target temperature of the samples; 2) a 30 second dark hold at the target temperature; 3) a 0.6 second UV light exposure; 4) 1 minute hold at target temperature. Steps 3-4 were repeated 8 times for 9 separate exposures to UV light passed through a 280-450 nm bandwidth filter, a fairly good facsimile of a Heraeus D lamp. 10 g of a curable blend of vinylsilicone base polymer 1 and hydride-functional silicone crosslinker 3 were mixed with 0.05 g of anhydride functional polymer AA with sufficient MeCpPtMe$_3$ catalyst to furnish 50 or 25 ppm Pt. The H/vinyl ratio was maintained at 2.0. 14-18 mg samples of catalyzed formula were dropped into sample pans mounted in the instrument along with reference pans. An exothermic hydrosilylation reaction was observed for each sequential pulse of UV light by calorimetric response and expressed as a percent of the total exotherm resulting from all 9 UV pulse exposures. Sample temperature was limited to the range of 25-80° C. The results are tabulated below:

TABLE 9

| 50 ppm Pt formulation | | | | |
| --- | --- | --- | --- | --- |
| Isothermal Temp, C. | 1$^{st}$ exposure, % of exotherm | 2$^{nd}$ exposure, % of exotherm | 4$^{th}$ exposure, % of exotherm | 6$^{th}$ exposure, % of exotherm |
| 25 | 49.8 | 75.7 | 84.0 | 90.4 |
| 50 | 74.7 | 81 | 86.2 | 95.0 |
| 60 | 80.7 | 87.6 | 93.3 | 97.0 |
| 70 | 85.4 | 88.3 | 92.3 | 95.3 |
| 80 | 75.8 | 83.3 | 88.0 | 92.0 |

TABLE 10

| 25 ppm Pt formulation | | | | |
| --- | --- | --- | --- | --- |
| Isothermal Temp, C. | 1$^{st}$ exposure, % of exotherm | 2$^{nd}$ exposure, % of exotherm | 4$^{th}$ exposure, % of exotherm | 6$^{th}$ exposure, % of exotherm |
| 25 | 66.8 | 83.8 | 89.6 | 93.3 |
| 50 | 83.2 | 88.2 | 93.3 | 98.1 |
| 80 | 84.3 | 87.4 | 91.9 | 95.1 |

An ideal photo-DSC response would be that the initial 0.6 second exposure would result in complete reaction of vinyl and SiH available in the formulation (100% of exotherm). What this experiment demonstrated was that mild heating of the curable formulation prior to UV light exposure unambiguously speeds the photo-response and therefore reduces post-cure. In all cases the reaction is essentially complete (>90%) after 6×0.6 seconds exposure to UV light, but pre-heating the curable sample to 70° C. (with 50 ppm Pt present) results in an increase of reaction % with one exposure from around 50% to around 85%. The anomalous 80° C. result is likely caused by heat promoting thermal dark reaction before initial UV exposure thus limiting available crosslinking via photo-activation. Similar effects were observed when catalyst concentration was reduced to 25 ppm Pt.

So, MeCpPtMe$_3$ catalyzed photo cure silicone coatings can be more effectively and rapidly crosslinked by passing the coated substrate through mild heat from an oven or IR lamp radiation immediately before passing the warmed coating under UV curing lamps; a dual-cure process. Heating the coated formulation and substrate to which it is applied to 60° C. to 120 C ° should prevent or minimize demoisturization of paper substrates or damage of film or plastic coated paper substrates, and subsequent UV cure should be faster and more complete than UV exposure alone.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of a photocurable silicone composition, coatings formed from such compositions, articles comprising such coatings, and methods of forming such coatings and articles. Modifications may occur to those skilled in the art and to those who may make and use the invention. The disclosed embodiments are merely for illustrative purposes and not intended to limit the scope of the invention or the subject matter set forth in the claims.

What is claimed is:

1. A photocurable silicone composition comprising:
(i) a vinyl functional polysiloxane of the formula (Ia):

$$M^{1vi}D^{1vi}{}_cD^2{}_dM^{1vi} \quad (Ia)$$

where $M^{1vi}$ is $(R^1)(R^2)(CH_2=CH)SiO_{1/2}$; $D^{1vi}$ is $(R^6)(CH_2=CH))SiO_{2/2}$; $D^2$ is $(R^7)(R^8)SiO_{2/2}$; $R^1$, $R^2$, $R^3$, $R^5$, $R^6$, $R^7$, and $R^8$ are each independently a C1-C10 saturated hydrocarbon radical; c is 0; and d is 50-250;

(ii) a hydride functional siloxane selected from a compound of the formula (IIa), (IIb), or (IIc):

$$M^4D^{3H}{}_jD^4{}_kM^4Q^2 \quad (IIa)$$

$$M^4D^{3H}{}_jM^4 \quad (IIb)$$

$$M^{3H}{}_hQ^2 \quad (IIc)$$

where
$M^{3H}=(R^{10})(R^{11})(H)SiO_{1/2}$
$M^4=(R^{12})(R^{13})(R^{14})SiO_{1/2}$
$D^{3H}=(R^{15})(H)SiO_{2/2}$
$D^4=(R^{16})(R^{17})SiO_{2/2}$
$Q^2=SiO_{4/2}$
wherein $R^{10}$, $R^{11}$, $R^{12}$, $R^{13}$, $R^{14}$, $R^{15}$, $R^{16}$, $R^{17}$, and $R^{18}$ are each independently a C1-C10 saturated hydrocarbon, j+k in formaula (IIa) is 10-40, j in formula (IIb) is 10-40, and h is 2 in formula (IIc);

(iii) a photoactive catalyst selected from one or more of a platinum-cyclopentadiene complex of the formula (i) $R^{19}CpPtR^{20}{}_3$, where $R^{19}$ and $R^{20}$ are each methyl, and Cp is a cyclopentadiene group, wherein the bond between Cp and Pt is an eta bond; and/or (ii) [1-methyl-3-(1'-naphthyl)-cyclopentadienyl]trimethyl platinum; [1-methyl-3-(2'-naphthyl)-cyclopentadienyl]trimethyl platinum; and (iv) an acid-anhydride functional polysiloxane compound of the formula:

$$M^{5A}D^5{}_oD^{6A}{}_pD^{7H}{}_qM^{5A}$$

where $M^{5A}$ is $(R^{21})(R^{22})(R^{23})SiO_{1/2}$
$D^5$ is $(R^{24})(R^{25})SiO_{2/2}$,
$D^{6A}$ is $(R^{26})(R^{27})SiO_{2/2}$
$D^{7H}=(R^{28})(H)SiO_{2/2}$
where $R^{21}$, $R^{22}$, $R^{24}$, $R^{25}$, $R^{26}$, and $R^{28}$ are each methyl; $R^{23}$ and $R^{27}$ each independently represents an acid-anhydride functional group derived from the reaction of allyl succinic anhydride with Si(H) functionality; o+q is 10-40, and p is 1-20;
wherein the composition cures when processed at a speed of from about 100 to about 750 feet per minute.

2. The photocurable silicone composition of claim 1 further comprising a siloxanol resin.

3. The photocurable silicone composition of claim 1, wherein the ratio of hydride groups to vinyl groups is from about 0.5:1 to about 10:1.

4. The silicone photocurable composition of claim 1, wherein the ratio of hydride groups to vinyl groups is from about 1.5:1 to about 3:1.

5. The photocurable silicone composition of claim 1, wherein the ratio of hydride groups to vinyl groups is from about 2:1 to about 2.5:1.

6. The photocurable silicone composition of claim 1, wherein the vinyl functional polysiloxane (i) is present in an amount of from about 80 to about 99 parts by weight; the hydride functional polysiloxane (ii) is present in an amount of from about 1 to about 20 parts by weight; the acid-anhydride functional polysiloxane (iv) is present in an amount of from about 0.1 to 10 parts by weight, and the photoactive catalyst (iii) is present in an amount sufficient to provide platinum in an amount of about 50 to about 150 ppm; and each of the parts by weight is based on the total weight of the composition.

7. A method of forming a silicone film on a substrate comprising:
(a) applying the photocurable silicone composition of claim 1 onto a surface of the substrate; and
(b) exposing the photocurable silicone composition to a UV light source having a wavelength of from about 25 nm to about 500 nm.

8. The method of claim 7, wherein the UV light source is an H+ mercury vapor type UV lamp.

9. The method of claim 7, wherein the UV light source is a D type iron doped mercury vapor UV lamp.

10. The method of claim 7, wherein the substrate to which the photocurable silicone composition is applied is conveyed at a speed of from about 20 feet per minute to about 1,000 feet per minute.

11. The method of claim 7 further comprising focusing the light from the UV light source onto the photocurable silicone composition using one or more reflectors.

12. The method of claim 7 further comprising exposing the photocurable silicone composition and substrate to which it is applied to a heat source prior to exposing the composition to the UV light source.

13. The method of claim 12, wherein the heat source is chosen from an oven, an infrared lamp, an LED light source, or a combination thereof.

14. The method of claim 12, wherein the photocurable silicone composition and substrate to which it is applied are heated to a temperature of from about 25° C. to about 120° C.

15. The method of claim 7, wherein the substrate is selected from one or more of glassine, super-calendared Kraft (SCK) paper, clay-coated kraft (CCK) paper, polyethylene, polypropylene, polyester, a polyethylene-Kraft paper (PK), or a polypropylene-Kraft paper (PPK).

16. An article comprising a coating formed from the photocurable silicone composition of claim 1 disposed on a surface of a substrate.

17. The article of claim 16, wherein the article is a release liner, and the substrate is selected from one or more of glassine, super-calendared Kraft (SCK) paper, clay-coated kraft (CCK) paper, polyethylene, polypropylene, polyester, a polyethylene-Kraft paper (PK), or a polypropylene-Kraft paper (PPK).

18. An adhesive article comprising an adhesive backed substrate in releasable contact with a release layer, the release layer comprising a coating formed from the phototcurable silicone composition of claim 1.

19. An article formed from the method of claim 7.

\* \* \* \* \*